(12) United States Patent
Kinoshita et al.

(10) Patent No.: US 9,047,530 B2
(45) Date of Patent: Jun. 2, 2015

(54) RECORDING MEDIA PROCESSING DEVICE, CONTROL METHOD OF A RECORDING MEDIA PROCESSING DEVICE, AND COMPUTER-READABLE RECORDING MEDIUM STORING A PROGRAM

(71) Applicant: SEIKO EPSON CORPORATION, Tokyo (JP)

(72) Inventors: Yoshiaki Kinoshita, Matsumoto (JP); Atsushi Natsuno, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 43 days.

(21) Appl. No.: 13/938,676

(22) Filed: Jul. 10, 2013

(65) Prior Publication Data

US 2014/0023263 A1 Jan. 23, 2014

(30) Foreign Application Priority Data

Jul. 18, 2012 (JP) ................................. 2012-159320

(51) Int. Cl.
  *G06K 9/00* (2006.01)
  *G06K 9/18* (2006.01)
(52) U.S. Cl.
  CPC ..................................... *G06K 9/186* (2013.01)
(58) Field of Classification Search
  CPC ........ G06K 7/084; G06K 9/186; G06K 9/726
  USPC .................................................. 382/139, 140
  See application file for complete search history.

(56) References Cited

U.S. PATENT DOCUMENTS

| | | | | |
|---|---|---|---|---|
| 6,760,470 B1 * | 7/2004 | Bogosian et al. | ............. | 382/139 |
| 6,986,464 B2 | 1/2006 | Takiguchi et al. | | |
| 7,680,317 B2 * | 3/2010 | Adelberg et al. | ............. | 382/139 |
| 7,689,025 B2 * | 3/2010 | Takiguchi | ..................... | 382/139 |
| 8,023,717 B1 * | 9/2011 | Gudenburr et al. | ........... | 382/139 |
| 8,180,137 B2 * | 5/2012 | Faulkner et al. | ............. | 382/139 |

FOREIGN PATENT DOCUMENTS

| | | | |
|---|---|---|---|
| JP | 2004206362 A | | 7/2004 |
| JP | 4438387 | B2 | 9/2004 |
| JP | 4947122 | B2 | 1/2010 |
| JP | 2012159912 A | | 8/2012 |
| JP | 2012166837 A | | 9/2012 |

(Continued)

*Primary Examiner* — Tom Y Lu
(74) *Attorney, Agent, or Firm* — Lowe Hauptman & Ham, LLP

(57) ABSTRACT

The recognition rate is improved and recognition errors suppressed when recognizing magnetic ink characters. The character recognition unit 80 of a check reader 1 recognizes a magnetic ink character 101 by performing magnetic recognition based on comparing reference waveform data with character waveform data acquired by reading the magnetic ink character 101 with a magnetic head 54, and optical recognition based on comparing reference image data with image data acquired by reading the magnetic ink character 101 with a front contact image sensor 52; selects a plurality of candidates for the magnetic ink character 101 by magnetic recognition; and when plural candidates are characters with mutually similar character waveform data, determines that the one plural candidate character that matches the character recognized by optical recognition with reliability exceeding a specific threshold is the magnetic ink character 101.

7 Claims, 11 Drawing Sheets

(56) References Cited

FOREIGN PATENT DOCUMENTS

| | | |
|---|---|---|
| JP | 2012168837 A | 9/2012 |
| JP | 2012174093 A | 9/2012 |
| JP | 2012185762 A | 9/2012 |
| JP | 2012185763 A | 9/2012 |
| JP | 2012198852 A | 10/2012 |
| JP | 2012221276 A | 11/2012 |
| JP | 2012221337 A | 11/2012 |
| JP | 2012226633 A | 11/2012 |
| JP | 2012243063 A | 12/2012 |
| JP | 2012252560 A | 12/2012 |

* cited by examiner

BOLD LINE ··· REFERENCE WAVEFORM DATA
THIN LINE ··· CHARACTER WAVEFORM DATA

| TARGET CHARACTER (a) | FIRST SIMILAR CHARACTER | SECOND SIMILAR CHARACTER |
|---|---|---|
| 2 | 5 | 3 |

FIG. 8A

| TARGET CHARACTER (b) | SIMILAR CHARACTER |
|---|---|
| 7 | 5 |

FIG. 8B (a) SELECTION FLAG SET

| MAGNETIC RECOGNITION | | OPTICAL RECOGNITION | | RESULT | |
|---|---|---|---|---|---|
| FIRST CANDIDATE | SECOND CANDIDATE | FIRST CANDIDATE | SECOND CANDIDATE | ≧80 | 80> |
| A | B | A | — | A | USE RESULT OF MAGNETIC RECOGNITION |
| | | B | | B | |
| | | C | A | A | |
| | | | B | B | |
| | | | D | UNRECOGNIZABLE | |

FIG. 11A (b) SELECTION FLAG NOT SET

| MAGNETIC RECOGNITION | | | | OPTICAL RECOGNITION | RESULT | | |
|---|---|---|---|---|---|---|---|
| RESULT | FIRST CANDIDATE | SECOND CANDIDATE | THIRD CANDIDATE | FIRST CANDIDATE | ≧90 | ≧80 | 80> |
| A | A | B | C | A | A | A | A |
| | | | | B | B | | |
| | | | | C | C | | |
| | | | | D | UNRECOGNIZABLE | | |
| UNRECOGNIZABLE | A | B | C | A | A | UNRECOGNIZABLE | UNRECOGNIZABLE |
| | | | | B | B | | |
| | | | | C | C | | |
| | | | | D | UNRECOGNIZABLE | | |

FIG. 11B

RECORDING MEDIA PROCESSING DEVICE, CONTROL METHOD OF A RECORDING MEDIA PROCESSING DEVICE, AND COMPUTER-READABLE RECORDING MEDIUM STORING A PROGRAM

RELATED APPLICATIONS

The present application is based on, and claims priority from, Japanese Application Number 2012-159320, filed Jul. 18, 2012, the disclosure of which is hereby incorporated by reference herein in their entirety.

BACKGROUND

1. Technical Field

The present disclosure relates to a recording media processing device, a method of controlling a recording media processing device, and a computer-readable recording medium storing a program.

2. Related Art

Recording media processing devices (check readers) that have a magnetic head for reading a magnetic ink character line (MICR line) recorded on checks and similar recording media, read the magnetic ink characters contained in the MICR line of the recording medium conveyed through a conveyance path, and recognize each magnetic ink character are known from the literature. See, for example, Japanese Unexamined Patent Appl. Pub. JP-A-2004-206362.

Recording media processing devices such as described in JP-A-2004-206362 recognize the characters in the MICR line by means of magnetic recognition, a process of recognizing characters from character waveform data obtained by magnetically reading the MICR line, and optical recognition, a process of recognizing characters from image data obtained by optically scanning the MICR line. Because soiling and the signature written on the check face can result in optical recognition errors, the result of the magnetic recognition process is generally given priority with optical recognition used in a complementary role. For example, magnetic recognition is used to read the MICR line, select recognition candidates by comparing the character waveform data with reference waveform data, and then identify the character from among the selected candidates. Optical recognition is applied when a character cannot be recognized by the magnetic recognition process, and recognition of the magnetic ink character is confirmed if the results of magnetic recognition and optical recognition match.

There also characters whose magnetic waveforms will be similar to each other if distortion (such as stretching or compression) is introduced to the character waveform data by the printing condition of the magnetic ink characters or check conveyance, possibly resulting in a character with a similar waveform being mistakenly recognized as the magnetic ink character. When this happens and the magnetic recognition process confirms the wrong character as the result of magnetic recognition, rectifying the recognition error is difficult. When a character cannot be recognized by magnetic recognition but the correct character is recognized optically, the results of magnetic and optical recognition will not match if the correct character was not selected as a candidate in the magnetic recognition process, and recognizing the correct character is difficult.

SUMMARY

The present disclosure is directed to solving the foregoing problem as described in the following preferred embodiments.

One aspect of the disclosure is a recording media processing device including: a magnetic reading unit that magnetically reads a magnetic ink character recorded on a recording medium; an optical reading unit that optically reads the magnetic ink character; and a character recognition unit that performs magnetic recognition based on comparing reference waveform data with character waveform data obtained by reading the magnetic ink character with the magnetic reading unit, and optical recognition based on comparing reference image data with image data obtained by scanning the magnetic ink character with the optical reading unit, and recognizes the magnetic ink character. The character recognition unit selects plural candidate characters for the magnetic ink character by magnetic recognition, and when the plural candidates are characters having similar character waveform data, recognizes the one candidate character that matches the character recognized by optical recognition with reliability exceeding a specific threshold as the magnetic ink character.

There are characters whose waveforms can easily resemble each others due to waveform distortion, for example, in magnetic recognition based on comparing character waveform data with reference waveform data. When plural characters selected by magnetic recognition as candidates for recognition are characters for which the waveforms can easily resemble each other, this aspect of the disclosure 0 0 9 0 2 5 0 recognizes the magnetic ink character by preferentially selecting the character (magnetic recognition candidate) that matches a character recognized by optical recognition with reliability exceeding a specific threshold. As a result, when the magnetic ink character is mistakenly recognized by magnetic recognition or determining the correct magnetic ink character is difficult due to the waveforms of the selected plural candidate characters being similar to each other, the correct character can be selected and recognized by comparing the candidate characters with the result of optical recognition. Recognition errors can therefore be reduced and the recognition rate improved in magnetic ink character recognition.

In a recording media processing device according to another aspect of the disclosure, the specific reliability has at least two threshold levels; and when the plural candidates are characters with similar character waveform data, the character recognition unit uses the lower threshold level when recognizing the magnetic ink character by optical recognition.

When plural characters selected by magnetic recognition as candidates for the magnetic ink character 101 are characters with mutually similar character waveform data, being able to select any one of the characters identified as a candidate as the correct character is sufficient. By using the lower threshold as the reliability threshold for selecting a candidate by optical recognition, the disclosure increases the possibility of being able to select a candidate by optical recognition.

Further preferably in a recording media processing device according to another aspect of the disclosure, the character recognition unit includes the character for which the difference between the character waveform data and the reference waveform data is smallest as a first candidate when selecting the plural candidates, and when a character with character waveform data similar to the character waveform data of the first candidate is not included in the plural candidates, adds a character with character waveform data similar to the character waveform data of the first candidate character to the plural candidates.

When a character with character waveform data similar to the correct character is selected as a candidate and the correct character is not selected as a candidate for magnetic recognition, the correct character cannot be selected (recognized) by comparison with the result of optical recognition. When a character with character waveform data similar to the character waveform data of the character selected as the first candidate is not included in the characters selected by magnetic recognition, the disclosure adds a character with character waveform data similar to the character waveform data of the first candidate character to the plural candidates.

Another aspect of the disclosure is a method of controlling a recording media processing device that has a magnetic reading unit that magnetically reads a magnetic ink character recorded on a recording medium, an optical reading unit that optically reads the magnetic ink character, and a character recognition unit that recognizes the magnetic ink character by magnetic recognition based on comparing reference waveform data with character waveform data obtained by reading the magnetic ink character with the magnetic reading unit, and recognizes the magnetic ink character by optical recognition based on comparing reference image data with image data obtained by scanning the magnetic ink character with the optical reading unit. When the plural characters selected as candidates of the magnetic ink character by magnetic recognition are characters with mutually similar character waveform data, and one of the plural characters matches a character selected by optical recognition with reliability exceeding a specific threshold as a candidate for the magnetic ink character, this control method recognizes the character that matched as the magnetic ink character.

Further preferably, the specific reliability has at least two threshold levels; and when the plural candidates selected by magnetic recognition are characters with similar character waveform data, the lower threshold level is used for recognition when recognizing the magnetic ink character by optical recognition.

Yet further preferably, the control method includes steps of: including the character for which the difference between the character waveform data and the reference waveform data is smallest as a first candidate when selecting the plural candidates; and adding a character with character waveform data similar to the character waveform data of the first candidate character to the plural candidates when a character with character waveform data similar to the character waveform data of the first candidate is not included in the plural candidates.

There are characters whose waveforms can easily resemble each others due to waveform distortion, for example, in magnetic recognition based on comparing character waveform data with reference waveform data. When plural characters selected by magnetic recognition as candidates for recognition are characters for which the waveforms can easily resemble each other, this method of the disclosure recognizes the magnetic ink character by preferentially selecting the character (magnetic recognition candidate) that matches a character recognized by optical recognition with reliability exceeding a specific threshold. As a result, when a character with a similar waveform is mistakenly recognized in magnetic recognition, or the correct character cannot be selected from among the characters selected as candidates in magnetic recognition, the correct character can be selected and recognized by comparing with the result of optical recognition. Recognition errors can therefore be reduced and the recognition rate improved in magnetic ink character recognition.

Another aspect of the disclosure is a computer-readable recording medium storing a program executed by a control unit that controls parts of a recording media processing device that has a magnetic reading unit that magnetically reads a magnetic ink character recorded on a recording medium, an optical reading unit that optically reads the magnetic ink character, and a character recognition unit that recognizes the magnetic ink character by magnetic recognition based on comparing reference waveform data with character waveform data obtained by reading the magnetic ink character with the magnetic reading unit, and recognizes the magnetic ink character by optical recognition based on comparing reference image data with image data obtained by scanning the magnetic ink character with the optical reading unit. When the plural characters selected as candidates of the magnetic ink character by magnetic recognition are characters with mutually similar character waveform data, and one of the plural characters matches a character selected by optical recognition with reliability exceeding a specific threshold as a candidate for the magnetic ink character, this program recognizes the character that matched as the magnetic ink character.

There are characters whose waveforms can easily resemble each others due to waveform distortion, for example, in magnetic recognition based on comparing character waveform data with reference waveform data. When plural characters selected by magnetic recognition as candidates for recognition are characters for which the waveforms can easily resemble each other, this program of the disclosure recognizes the magnetic ink character by preferentially selecting the character (magnetic recognition candidate) that matches a character recognized by optical recognition with reliability exceeding a specific threshold. As a result, when a character with a similar waveform is mistakenly recognized in magnetic recognition, or the correct character cannot be selected from among the characters selected as candidates in magnetic recognition, the correct character can be selected and recognized by comparing the magnetic recognition candidates with the result of optical recognition.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIG. 8A and FIG. 8B are tables of characters whose waveforms can easily resemble each other when waveform distortion occurs.
FIGS. 11A and 11B describe a method of confirming the final recognition result, wherein
FIG. 11A shows the method used when the selection flag is set,
and FIG. 11B shows the method used when the selection flag is not set.

DESCRIPTION OF EMBODIMENTS

Preferred embodiments of a recording media processing device, a method of controlling the recording media processing device, and a program according to the present disclosure are described below with reference to the accompanying figures. A recording media processing device according to this embodiment of the disclosure is a device that recognizes a string of magnetic ink characters printed on the MICR line of a recording medium in order to verify the validity of the recording medium, which in this embodiment is a business or personal check.

Checks and Magnetic Ink Characters

A check 4 used as an example of the recording medium in this embodiment, and magnetic ink characters 101, are described first.

Figure 1A:
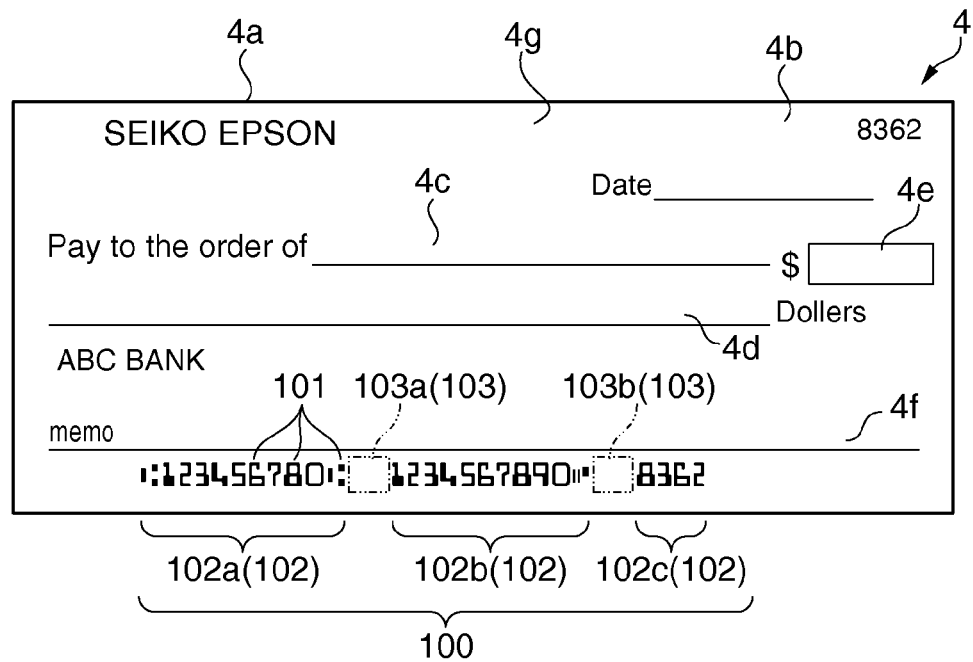
FIG. 1A shows an example of a check.
Figure 1B:
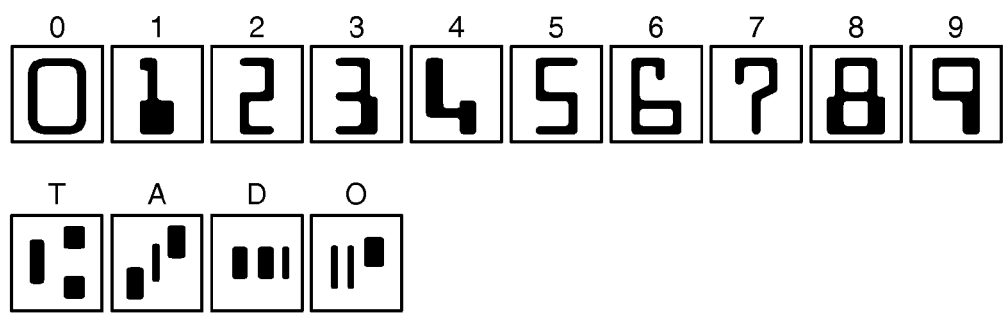
FIG. 1B shows examples of magnetic ink characters.

FIG. 1A shows an example of a check, and FIG. 1B shows an example of magnetic ink characters. More specifically, FIG. 1A shows a check, and FIG. 1B shows the characters in the E-13B MICR font.

As shown in FIG. 1A, the check 4 has a date field 4b, payee field 4c, amount fields 4d and 4e, and a signature line 4f on the front 4g of the check form 4a. The check form 4a is a cut-sheet medium. Note that fields 4b to 4f are still empty in FIG. 1. An MICR line 100 containing multiple magnetic ink characters 101 expressing the bank number, account number, and check number is printed along the bottom of the check form 4a. An endorsement area is provided on the back 4h of the check 4 (see FIG. 2).

The MICR line 100 includes plural fields 102 (102a, 102b, 102c) delimited by space characters 103 (103a, 103b). Each of the fields 102a, 102b, 102c is a continuous string of magnetic ink characters 101, and in this example correspond to the bank number, account number, and check number from the left end of the line.

As indicated by the imaginary lines in FIG. 1A, a space character 103a is placed between fields 102a and 102b, and another space character 103b is placed between fields 102b and 102c. These space characters 103 (103a, 103b) are recognized as space characters by the check reader 1. The space characters 103 (103a, 103b) may also occupy the width of one or multiple magnetic ink characters 101.

The magnetic ink characters 101 are characters magnetically printed on the check 4 using a specific font (such as the E-13B font), and one magnetic ink character 101 corresponds to one of plural predefined characters.

As shown in FIG. 1B, the E-13B font consists of 14 shapes corresponding to the shapes of the magnetic ink characters 101. These 14 shapes include the 10 numbers 0 to 9, and four special symbols, a transit symbol T, an amount symbol A, a dash symbol D, and an On-Us symbol O.

The MICR line 100 may be printed on the check 4 by offset printing or laser printing. The actual shapes of the magnetic ink characters 101 in the E-13B font produced by offset printing, and the magnetic ink characters 101 in the E-13B font produced by laser printing, may differ.

Recording Media Processing Device

A recording media processing device according to this embodiment of the disclosure is described next. A recording media processing device according to this embodiment of the disclosure includes a check reader 1 and host computer 70.

Figure 2:
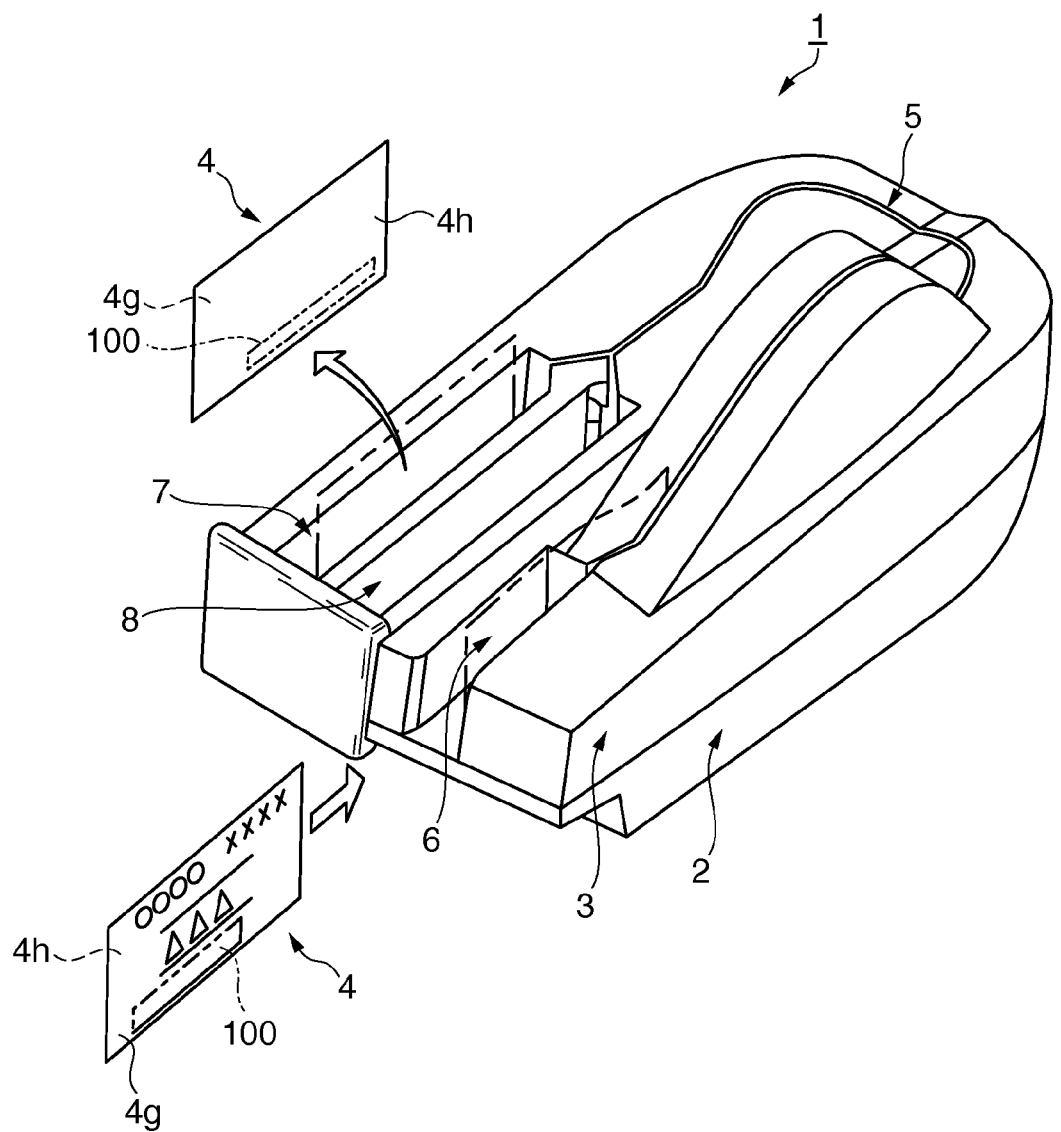
FIG. 2 is an oblique view of a check reader according to a preferred embodiment of the disclosure.

The basic configuration of a check reader 1 according to this embodiment of the disclosure is described first. FIG. 2 is an oblique view of the check reader 1 according to this embodiment of the disclosure. The check reader 1 is a device that processes checks 4, including reading magnetic ink characters recorded on a check 4, scanning both sides of the check 4, and recording a specific image in the endorsement area of the check 4.

The check reader 1 has a bottom case 2, and a cover case 3 covering the top of the bottom case 2, and other components assembled inside. A check 4 conveyance path 5 is formed inside the cover case 3 as a narrow vertical channel that is U-shaped when seen from above. One end of the conveyance path 5 communicates with a check supply unit 6 formed as a wide vertical hopper, and the other end of the conveyance path 5 splits left and right into first check discharge unit 7 and second check discharge unit 8, both of which are also wide vertical pockets.

Checks 4 are inserted to the check supply unit 6 with the top and bottom edges aligned so that the top edges (up in FIG. 1A) are up and the bottom edges (down in FIG. 1A) down, and the front and back sides matched so that the front 4g faces the outside of the U-shaped conveyance path 5 (as shown in FIG. 2). The checks 4 inserted to the check supply unit 6 are conveyed through the conveyance path 5 with the right edge shown in FIG. 1 as the leading end.

As a check 4 fed from the check supply unit 6 is conveyed through the conveyance path 5, a front image, which is an image of the front 4g, and a back image, which is an image of the back 4h, are scanned, and the MICR line 100 recorded on the front 4g is magnetically read. Checks 4 from which the MICR line 100 is successfully read are then discharged into the first check discharge unit 7 after a specific endorsement image is recorded thereon.

Checks 4 from which reading the MICR line 100 failed are then discharged into the second check discharge unit 8 without recording the specific endorsement image. A check 4 discharged into the second check discharge unit 8 may then be examined to determine why reading failed, or scanned again, for example.

Figure 3:
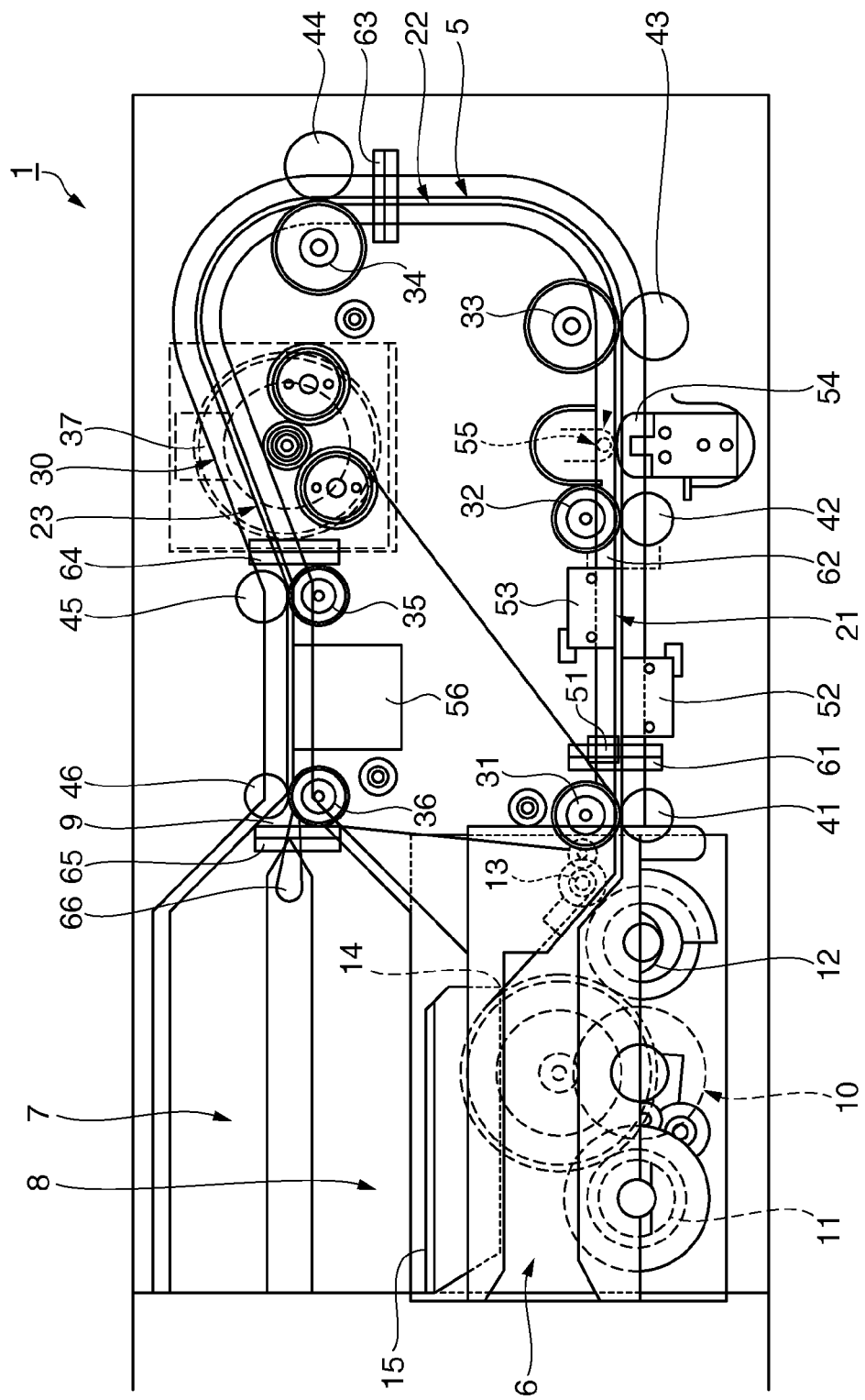
FIG. 3 shows the internal configuration of the check reader.

FIG. 3 shows the internal configuration of the check reader 1. The check supply unit 6 has a check feed mechanism 10 for feeding checks 4 (see FIG. 2) into the conveyance path 5. The check feed mechanism 10 includes a delivery roller 11, a feed roller 12, a retard roller 13 pressed against the feed roller 12, a paper feed motor 14, and a check-pressing hopper 15.

When the paper feed motor 14 drives, the checks 4 loaded in the check supply unit 6 are pressed by the check-pressing hopper 15 to the delivery roller 11 side, and the delivery roller 11 and feed roller 12 are then driven synchronously.

The check 4 is then fed between the feed roller 12 and retard roller 13 by the delivery roller 11. A specific rotational load is applied to the retard roller 13, and only the one check 4 directly contacting the feed roller 12 is separated from the other checks 4 and fed into the conveyance path 5.

The conveyance path 5 is U-shaped as described above, and has a straight upstream conveyance path portion 21 connected to the check supply unit 6, a downstream conveyance path portion 23 that curves slightly and connects to the first check discharge unit 7 and second check discharge unit 8, and a curved conveyance path portion 22 that connects the upstream conveyance path portion 21 and downstream conveyance path portion 23.

A check conveyance mechanism 30 conveys checks 4 fed into the conveyance path 5 from the check supply unit 6 through the conveyance path 5. The check conveyance mechanism 30 includes first to sixth conveyance rollers 31 to 36, first to sixth pressure rollers 41 to 46 that are pressed against and rotate in unison with the opposing conveyance rollers, and a conveyance motor 37 that rotationally drives the first to sixth conveyance rollers 31 to 36.

The first to sixth conveyance rollers 31 to 36 rotate synchronously. A stepper motor, for example, is used as the conveyance motor 37. The conveyance distance of a check 4 can therefore be known from the number of steps the stepper motor is driven.

The first to third conveyance rollers 31 to 33 are respectively disposed at the upstream end and middle of the upstream conveyance path portion 21, and at the junction to the curved conveyance path portion 22. The fourth conveyance roller 34 is disposed to the downstream end of the curved conveyance path portion 22. The fifth and sixth conveyance rollers 35, 36 are respectively disposed in the middle and downstream end of the downstream conveyance path portion 23.

A magnet 51 for magnetizing magnetic ink characters, a front contact image sensor 52, and a back contact image sensor 53 are disposed in order from the upstream end of the upstream conveyance path portion 21 between the first conveyance roller 31 and second conveyance roller 32. The MICR line 100 recorded on a check 4 is magnetized by the magnet 51.

The front contact image sensor 52 faces the front 4*g* of the check 4 conveyed through the conveyance path 5, and scans a front image, which is an image of the front 4*g*. The back contact image sensor 53 faces the back 4*h* of the check 4 conveyed through the conveyance path 5, and scans a back image, which is an image of the back 4*h*.

A magnetic head 54 is disposed between the second conveyance roller 32 and third conveyance roller 33 as a magnetic reading unit that reads the magnetic ink characters 101. The magnetic head 54 magnetically reads the MICR line 100 by detecting change in the magnetic flux density of the magnetized MICR line 100 at a specific sampling period to acquire signal waveform data as the recording medium is conveyed past the magnetic head 54.

A pressure plate 55 that presses the check 4 against the magnetic head 54 is disposed opposite the head. A recording device 56 for recording a specific endorsement image is disposed to the downstream conveyance path portion 23 between the fifth conveyance roller 35 and sixth conveyance roller 36. The recording device 56 includes a printhead, stamp, or other means capable of recording a specific image in an appropriate direction at a suitable position on the back 4*h* of the check 4 conveyed through the conveyance path 5.

Various sensors for controlling check conveyance are also disposed to the conveyance path 5. A paper length detector 61 for detecting the length of the conveyed check 4 is disposed at a position before the magnet 51. A multifeed detector 62 for detecting if checks 4 are multifed is disposed between the back contact image sensor 53 and the second conveyance roller 32. A jam detector 63 is disposed at a position before the fourth conveyance roller 34, and a paper jam resulting from the check 4 being stuck in the conveyance path 5 is detected when a check 4 is detected continuously for at least a specific time by the jam detector 63.

A printing detector 64 for detecting the presence of a check 4 to be endorsed by the recording device 56 is disposed at a position before the fifth conveyance roller 35. A discharge detector 65 is disposed at a position downstream from the sixth conveyance roller 36, that is, at the junction 9 where the conveyance path 5 branches to the first check discharge unit 7 and second check discharge unit 8, to detect discharged checks 4.

A flapper 66 that is operated by a drive motor 67 (see FIG. 4) is disposed to the junction 9. The flapper 66 selectively communicates the downstream end of the conveyance path 5 with the first check discharge unit 7 or second check discharge unit 8, and guides the check 4 into the selected discharge unit.

Figure 4:
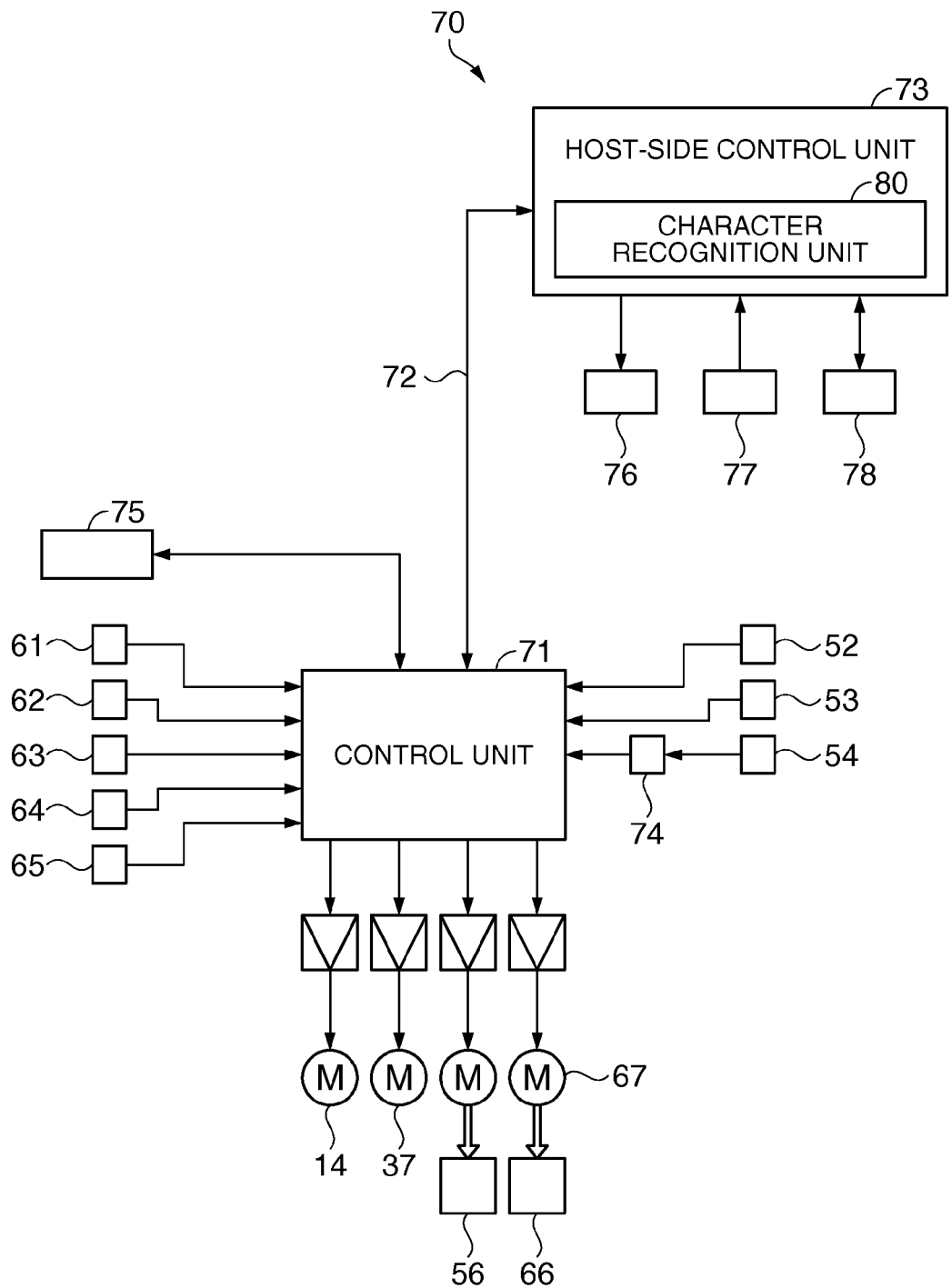
FIG. 4 is a block diagram showing the functional configuration of the check reader.

FIG. 4 is a block diagram showing the functional configuration of the check reader 1. A control unit 71 centrally controls other parts of the check reader 1 as controlled by the host-side control unit 73 of the host computer 70 described below, and includes a CPU, RAM, ROM, and other peripheral circuits.

As controlled by the host-side control unit 73, the control unit 71 drives the paper feed motor 14 and conveyance motor 37 to feed the checks 4 one at a time into the conveyance path 5 (FIG. 2), and convey the supplied check 4 through the conveyance path 5. Conveyance control of a check 4 by the control unit 71 is based on detection signals from the paper length detector 61, multifeed detector 62, jam detector 63, printing detector 64, and discharge detector 65 disposed to the conveyance path 5.

As a check 4 is conveyed, the front contact image sensor 52 and back contact image sensor 53 scan front and back images of the check 4 conveyed through the conveyance path 5, and output the image data of the captured images to the control unit 71. The control unit 71 outputs this image data to the host-side control unit 73.

The magnetic head 54 detects the electromagnetic force produced by change in the magnetic field created by the passing MICR line 100 (FIG. 1A) as controlled by the control unit 71, and outputs the resulting detection signal to a signal processing circuit 74.

The signal processing circuit 74 includes an amplifier, filter for removing noise, and A/D converter, amplifies and waveshapes the detection signal input from the magnetic head 54, and outputs the result as data to the control unit 71. The control unit 71 sends data describing the detection signal input from the signal processing circuit 74 to the host-side control unit 73.

An operating unit 75 includes switches such as a power switch and operating switches disposed to the bottom case 2 (FIG. 2), detects user operation of these switches, and outputs to the control unit 71.

A host computer 70 is connected to the check reader 1 through a communication cable 72. The host computer 70 has a host-side control unit 73 including a CPU, RAM, ROM, and other peripheral circuits. The host-side control unit 73 includes a character recognition unit 80 described below.

Connected to the host-side control unit 73 are a display 76 for displaying information, an operating unit 77 to which input devices such as a keyboard and mouse are connected, and a storage unit 78 such as an EEPROM or hard disk device capable of storing data rewritably. The storage unit 78 stores data for the front and back images of the checks 4 input from the check reader 1, and detection signal data.

In this embodiment of the disclosure the control unit 71 of the check reader 1 controls parts of the check reader 1 as controlled by the host-side control unit 73 of the host computer 70. More specifically, the host-side control unit 73 controls parts of the check reader 1 by the CPU of the control unit 73 running a program stored in ROM, generating control data (commands) for controlling the control unit 71, and outputting the resulting control data to the control unit 71 of the check reader 1. The host computer 70 and check reader 1 in this embodiment of the disclosure thus cooperate to function as a recording media processing device for processing checks 4 as the recording medium.

Using a check 4 for a business transaction is described briefly next. The buyer of some product writes the date, payee, amount (in numbers and words), and signature in the fields 4*b*, 4*c*, 4*d*, 4*e*, 4*f* of the check form 4*a* (see FIG. 1A), and then presents the check 4 to the payee. The payee then recognizes the MICR line 100 with the check reader 1, and determines the validity of the check 4 by verifying the recognized data with a specific institution.

If check 4 validity is confirmed, endorsement information is recorded on the back of the check 4. The amount may then be printed on the endorsed check 4 in a MICR line 100 of magnetic ink characters 101 on the right by the payee, bank, or payment processing center. The check 4 is then processed through the settlement system of the bank, and the amount specified in the MICR line 100 is remitted to the endorsing payee. Reading the MICR line 100 and accurate character recognition are therefore required for check 4 processing.

Character Recognition Unit

The character recognition unit 80 of the host-side control unit 73 is described next. The function of the character recognition unit 80 is achieved by the cooperation of hardware and software, such as the CPU of the host-side control unit 73 running a program stored in ROM.

The character recognition unit 80 recognizes each magnetic ink character 101 in the MICR line 100 by means of a magnetic recognition process that recognizes characters from the character waveform data obtained by magnetically reading the MICR line, and an optical recognition process that recognizes characters from optically captured image data. For each of the magnetic ink characters 101 that were read, character recognition either identifies (recognizes) the magnetic ink character 101 or determines that the magnetic ink character 101 cannot be identified (recognized).

If all of the magnetic ink characters 101 in the MICR line 100 can be recognized, this embodiment determines that reading the MICR line 100 succeeded. Reading the MICR line 100 fails if there is even only one magnetic ink character 101 that cannot be recognized.

In this embodiment, the MICR line 100 recorded on a check 4 is read by the magnetic head 54 and imaged by the front contact image sensor 52 as the check 4 travels through the conveyance path 5 as described above.

The MICR line 100 is read by the magnetic head 54 detecting change in the magnetic flux density of the MICR line 100 on the conveyed check 4 at a specific sampling period from the right end (the right in FIG. 1A) to the left end (the left in FIG. 1A).

Figure 5A:
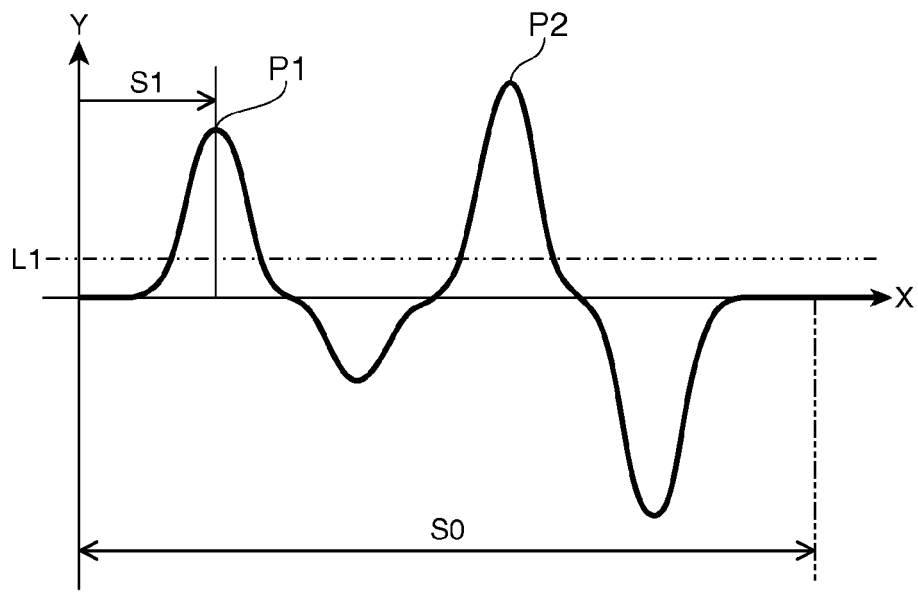
FIG. 5A shows an example of character waveform data.
Figure 5B:
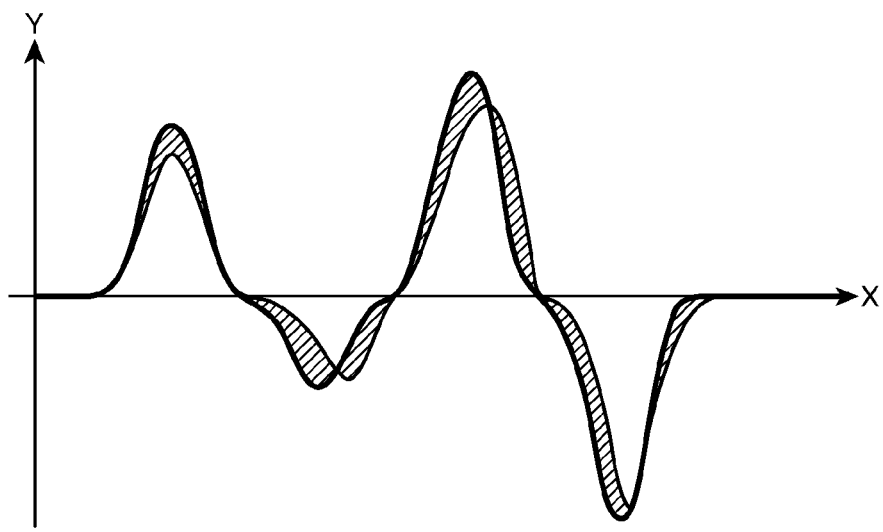
FIG. 5B shows an example of the difference between character waveform data and reference waveform data.

FIG. 5A shows an example of character waveform data. More specifically, FIG. 5A shows the character waveform data for one character in the magnetic ink character 101 set. FIG. 5B describes the difference between the character waveform data and reference waveform data.

Reading with the magnetic head 54 produces a continuous waveform such as shown in FIG. 5A for one character as the signal waveform data representing one magnetic ink character in the MICR line 100. Below, the shortest interval in the sampling period is one sampling unit, and the distance of 0.013 inch is referred to as one mesh.

The character recognition unit 80 applies processes including extracting and normalizing character waveform data for one character to the acquired signal waveform data. Extracting character waveform data refers to generating character waveform data such as shown in FIG. 5A for each magnetic ink character 101 in the MICR line 100 based on the signal waveform data acquired by reading the MICR line 100.

The passage of time (sampling period) is shown on the x-axis (horizontal axis) in FIG. 5A, and the sampling units pass sequentially to the right from the origin along the x-axis. The y-axis (vertical axis) shows the relative change in magnetic flux density over time.

Relative change in magnetic flux density during each specific sampling period is shown in FIG. 5A from the origin to the right on the x-axis (from the right side to the left side of the number 4 shown in FIG. 1B). The value on the y-axis moves up or down according to the change in the magnetic flux density of the magnetic ink character 101, and the value on the y-axis goes positive or negative according to whether the change in the magnetic flux density is positive or negative.

As shown in FIG. 5A, the period S0 on the x-axis occupied by character waveform data for one character is defined as a specific number of sampling units, and media conveyance is controlled and the length of one sampling unit is defined accordingly. Period S0 is also defined so that the first peak P1 appears at specific period S1 from the position where character extraction starts in the character waveform data for one character.

The character recognition unit 80 analyzes the signal waveform data, and of the waveform peaks that exceed a specific level L1, detects the first peak that appears in the direction of the end of the waveform (to the right on the x-axis) as the first peak P1.

A peak is a high or low point in the signal waveform data, and these peaks appear at a specific period along the x-axis. Peaks on the positive side (P1 and P2 in FIG. 5A) are called positive peaks, and peaks on the negative side are called negative peaks. The value on the x-axis corresponding to each peak is called the position (level) of the peak. The character waveform data of each of the 14 magnetic ink characters 101 has plural positive peaks and negative peaks.

For each magnetic ink character 101 in the MICR line 100, the character recognition unit 80 determines the start character extraction position so that the position of the detected first peak P1 is at the position length S1 from the origin on the x-axis of the extracted waveform. The character recognition unit 80 then extracts the character waveform data in the range occupied by the waveform for one character from this start character extraction position. The magnetic ink character 101 corresponding to the character waveform data extracted for one character is referred to below as the target character.

The character recognition unit 80 then normalizes the extracted character waveform data so that the amplitude levels on the y-axis coincide with the reference waveform data for pattern matching shown by the bold line in FIG. 5B. The reference waveform data is template data for the ideal waveform resulting from the magnetic head 54 reading a magnetic ink character 101 corresponding to one of the fourteen MICR characters.

The character recognition unit 80 then magnetically recognizes each of the magnetic ink characters 101 in the MICR line 100 from the extracted character waveform data based on specific recognition conditions. Magnetic recognition is performed as described below.

The character recognition unit 80 then compares the normalized character waveform data indicated by the thin line in FIG. 5B with reference waveform data for each character, and detects the difference therebetween. This difference is the size of the shaded area in FIG. 5B, and more specifically is the sum of the absolute values of the y-axis value of the waveform described by the character waveform data (signal level), and the y-axis value of the waveform described by the reference waveform data.

The smaller the difference between the character waveform data for one character and the reference waveform data for the same character, the closer the resemblance between the waveform represented by the character waveform data and the waveform represented by the reference waveform data, and the greater the probability that the magnetic ink character 101 described by the character waveform data is the character described by the reference waveform data.

After calculating the difference between the character waveform data for the one character and all 14 MICR characters, the character recognition unit 80 selects the character corresponding to the reference waveform data with the smallest difference as a first candidate, and the character corresponding to the reference waveform data with the next-smallest difference as a second candidate. The character recognition unit 80 then compares the difference between the character waveform data and the reference waveform data for the characters selected as the first candidate and second candidate with a specific threshold.

If the result of comparing the difference with the threshold level shows that the difference between the character waveform data and the reference waveform data used as the first candidate is less than or equal to the threshold, and the difference between the character waveform data and the reference waveform data used as the second candidate is greater than the threshold, the character recognition unit 80 determines that the magnetic ink character 101 was recognized, and confirms the character selected as the first candidate as the recognized character resulting from magnetic recognition.

The threshold used for magnetic recognition is set appropriately so that only the difference between the character waveform data and the reference waveform data for the correct character is less than or equal to the specific threshold, and the difference between the character waveform data and the reference waveform data for the other characters exceeds the threshold. As a result, if the difference with the first candidate exceeds the threshold, or there are plural characters resulting in a difference less than or equal to the threshold, an error such as a read error with the magnetic head 54 or a check 4 conveyance error may have occurred resulting in a recognition error, and recognition is determined not possible.

Waveform distortion such as stretching or compression of the waveform on the x-axis may occur in the acquired character waveform data due to variation in the character width of the magnetic ink characters 101 printed on the check 4, or deviation in the pitch while conveying the check 4 through the check reader 1, for example. When waveform distortion such as this occurs, the waveforms of different characters may resemble each other.

Figure 6A:
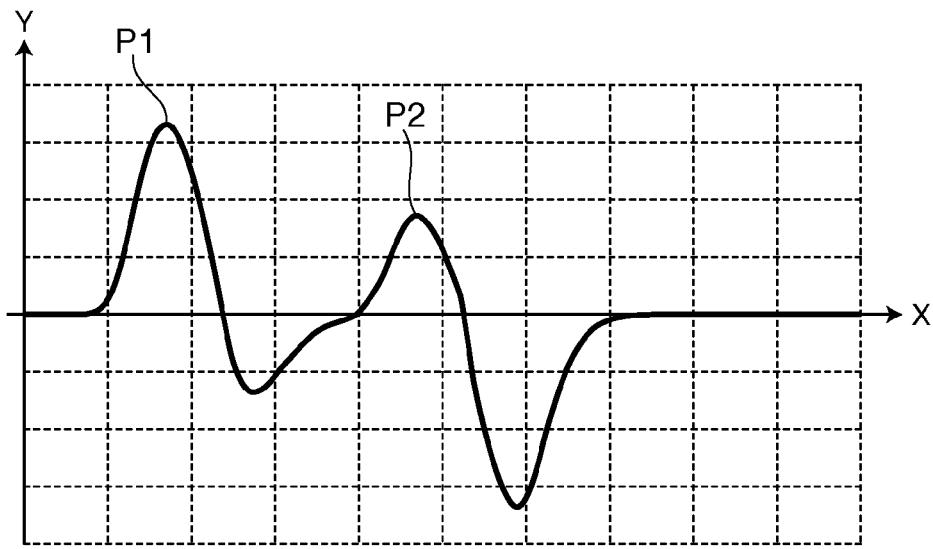
FIG. 6A, FIG. 6B, and FIG. 7 show examples of reference waveform data for characters whose waveforms can easily resemble each other when waveform distortion occurs.
Figure 6B:
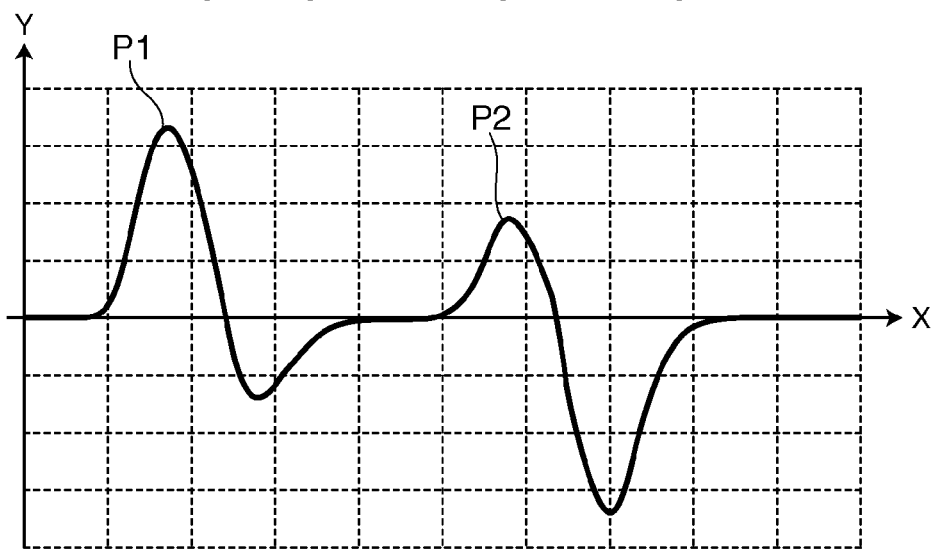
Figure 7:
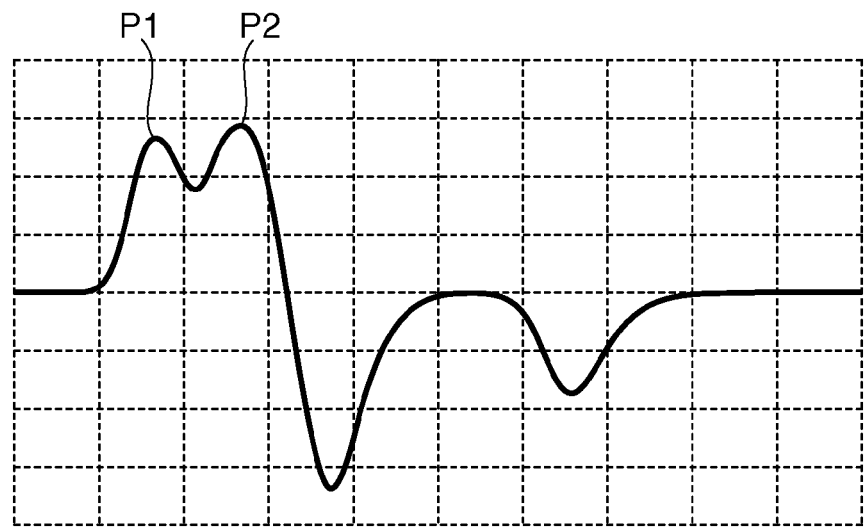

FIG. 6 and FIG. 7 show the waveforms of the reference waveform data for characters that easily resemble each other when waveform distortion occurs. More specifically, FIG. 6A shows the reference waveform for the number 2, and FIG. 6B shows the waveform for the number 5. FIG. 7A shows the waveform for the number 3. The scale of the x-axis in FIG. 6A, FIG. 6B, FIG. 7 is in units of 1 mesh.

FIG. 8 shows characters that resemble each other and result in recognition errors when waveform distortion occurs. More specifically, FIG. 8A shows a target character (a) and similar characters, and FIG. 8B shows another target character (b) and a similar character. Target character (a), target character (b), and similar characters resembling the target characters are described below.

As shown in FIG. 6A, the distance between first peak P1 and second peak P2 in the reference waveform data of the number 2 is 3 mesh. As shown in FIG. 6B, the distance between first peak P1 and second peak P2 in the reference waveform data of number 5 is 4 mesh, but the waveform portion before and after first peak P1 and the waveform portion before and after second peak P2 are similar to the corresponding portions in the waveform of the number 2 shown in FIG. 6A.

As a result, if the part of the waveform from the second peak P2 to the right in the waveform of the number 5 is shifted 1 mesh to the left, the resulting waveform will resemble the waveform for the number 2. Likewise, if the part from the second peak P2 to the right in the waveform of the number 2 is shifted 1 mesh to the right, the resulting waveform will resemble the waveform for the number 5. Characters that have substantially identical waveforms when waveform distortion occurs during magnetic recognition (referred to below as "similar characters") can therefore be easily mistakenly recognized as another character, such as when the correct character is the number 2 but is recognized as the number 5.

The reference waveform of the number 3 shown in FIG. 7 has the first peak P1 and second peak P2 close together and is apparently distinct from the waveform of the number 2. However, if waveform distortion results in the first peak P1 being clipped, the resulting waveform resembles the waveform of the number 2 and can result in a recognition error even though the similarity is not as strong as the similarity between the waveforms of the numbers 2 and 5.

A character (such as the number 2 in this example) for which there is character (such as the number 5 in this example) that has a strong possibility of being mistakenly recognized as the character selected as the first candidate in magnetic recognition is referred to as a target character (a) below. FIG. 8A shows an example of a target character (a).

Characters that may be easily mistakenly recognized as the target character (a) (such as the number 5 or number 3 when the number 2 is the target character) are referred to as similar characters. The similar character (number 5 in this example) that is more likely to be mistakenly recognized as the target character (a) is referred to as the "first similar character," and a similar character that is less likely to be mistakenly recognized than the first similar character (such as the number 3 in this example) is referred to as a "second similar character."

The target character (b) shown in FIG. 8B is a character, such as the number 7, for which there is a character (the number 5 in this example) that could be mistakenly recognized as the first candidate character although this possibility is not as strong as for target character (a).

The similarly between the target character (a) and first similar character shown in FIG. 8A is great, and the risk of a recognition error in magnetic recognition is high. For example, if the character selected as the first candidate as the result of magnetic recognition is the number 2, and the character selected as the second candidate is the number 5, there is a strong possibility that the correct character is either the number 2 or the number 5. Therefore, even if the first candidate is determined to be the number 2 by comparison with the threshold level, the correct character may be the number 5.

Therefore, when the character selected as the first candidate corresponds to a target character (a) and the character selected as the second candidate is the first similar character, recognition of the magnetic ink character 101 cannot be confirmed based on the result of magnetic recognition alone, and the result of magnetic recognition is compared with the result of optical recognition to make a final recognition decision.

A situation in which the number 2 is selected as the first candidate but the correct character is the number 3 is also conceivable. Therefore, when the character selected as the first candidate is a target character (a), and the character used as the second candidate is neither the first similar character or the second similar character, the second similar character is added as a third candidate character for magnetic recognition.

When the character selected as the first candidate is a target character (b) and the character selected as the second candidate does not correspond to the similar character, the similar character is also added as a third candidate for magnetic recognition. The result of magnetic recognition is also compared with the result of optical recognition to make a final decision in these situations.

Optical recognition is described next. In optical recognition, the character recognition unit 80 first identifies the range of data (group of pixels) corresponding to an image of the MICR line 100 in the data of an image of the check 4 face generated based on the result of scanning with the front contact image sensor 52. The character recognition unit 80 then segments this range of data into blocks (pixel matrixes) of a size equal to one character, extracts image data for each magnetic ink character 101, and compares the extracted image data with reference images (bitmap patterns) of the 14 characters in the magnetic ink character set.

Next, the character recognition unit 80 compares the extracted image data with the reference image data for each character to detect a similar reference image, and evaluates the degree of similarity therebetween, which is referred to herein as the reliability of recognition (recognition reliability). If the recognition reliability is greater than or equal to a specific threshold, recognition of the magnetic ink character 101 by optical recognition is determined successful, the character corresponding to the reference image data with the greatest similarity (highest reliability) is made the first optical recognition candidate obtained by optical recognition, and the next-most similar character (character with the next-highest reliability) is made the second candidate.

Reliability as used herein is the ratio of the number of black pixels and white pixels at the same positions (coordinate positions in the pixel matrix) in the character image data and the reference image data to the total number of pixels.

There could be stains or foreign matter on the face of the check 4 in part of the MICR line 100, or the signature or other content written by pen could overlap part of the MICR line 100. When such stains, foreign matter, or writing, for example, are included in the extracted image data, or an area containing stains, foreign matter, or writing outside the MICR line, is mistakenly extracted, magnetic ink characters 101 may be mistakenly recognized or the recognition rate will drop because recognition is not possible.

This embodiment applies magnetic recognition and optical recognition to all characters to be processed (recognized), and makes a final recognition decision by comparing the result of magnetic recognition and the result of optical recognition. Thus combining the results of magnetic recognition and optical recognition compensates for the risk of a lower recognition rate and recognition error in the separate magnetic and optical recognition processes, and improves the recognition rate and recognition accuracy of magnetic recognition.

Character Recognition Process

Figure 9:
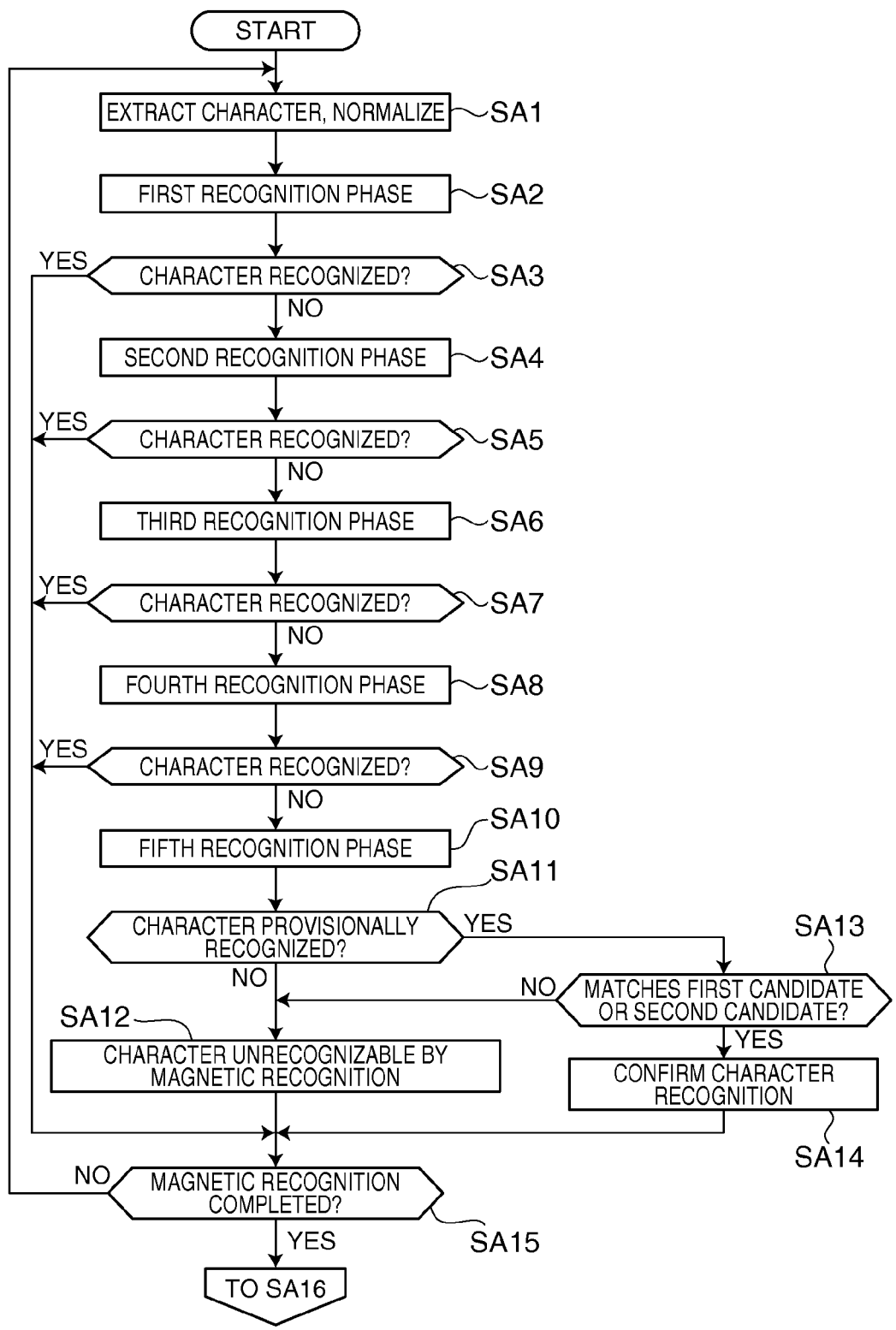
FIG. 9 is a flow chart describing the character recognition process in a check reader according to the disclosure.
Figure 10:
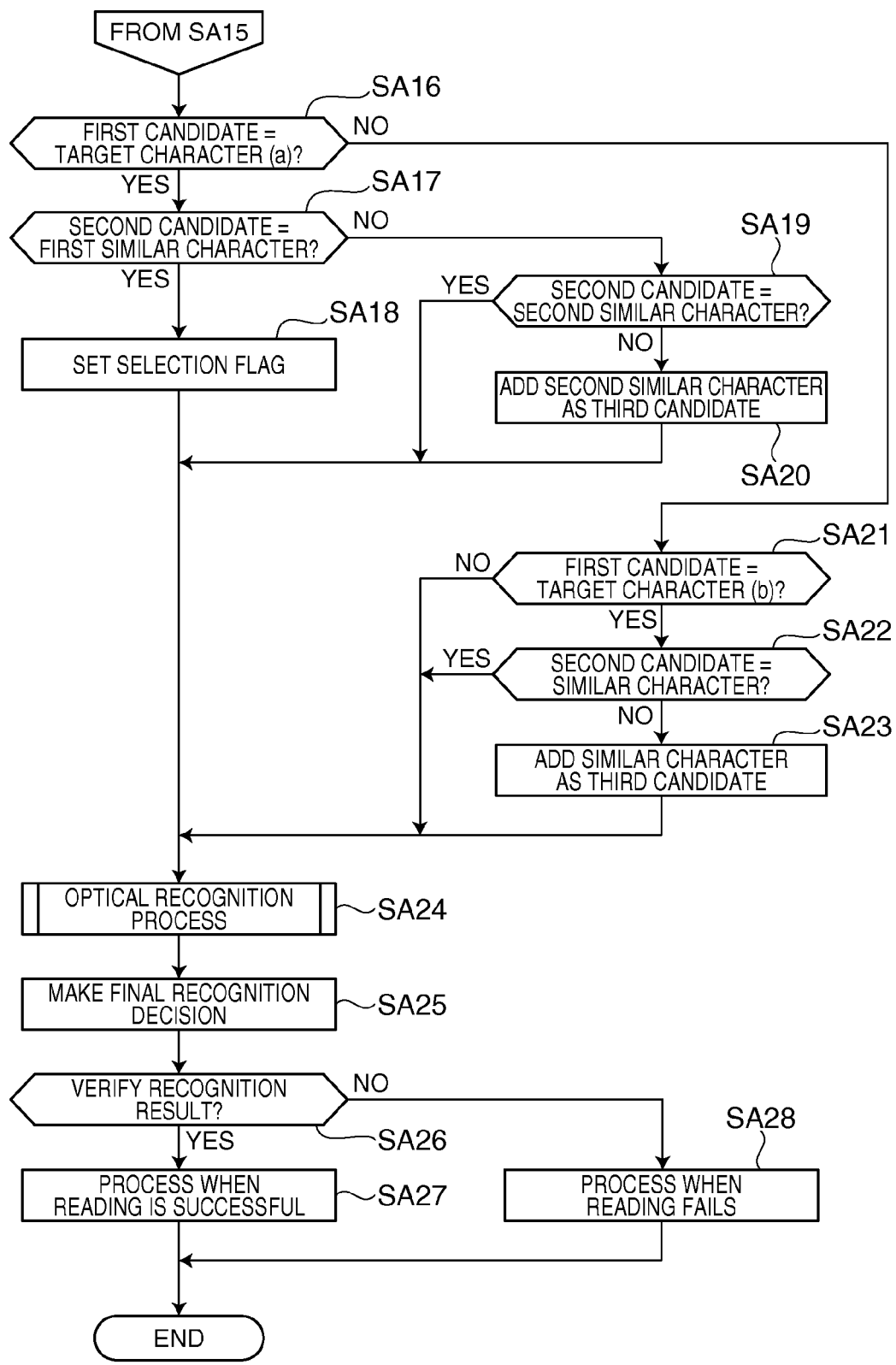
FIG. 10 is a flow chart describing the character recognition process in a check reader according to the disclosure.

The character recognition process in the check reader 1 according to this embodiment of the disclosure is described next. FIG. 9 and FIG. 10 are flow charts describing the character recognition process in a check reader according to this embodiment.

The MICR line 100 recorded on the check 4 is read by the magnetic head 54 before step SA1 in FIG. 9. Signal waveform data generated by the signal processing circuit 74 amplifying, filtering, and wave-shaping the read signal is then output by the control unit 71 to the host-side control unit 73. The front contact image sensor 52 also images the front of the check 4, and the image data is output from the control unit 71 to the host-side control unit 73.

Then in step SA1, the first peak P1 (FIG. 5A) used as the reference for the start character extraction position is detected in the acquired signal waveform data. Based on the position of the detected first peak P1, the character recognition unit 80 extracts character waveform data for one character corresponding to a magnetic ink character 101 from the signal waveform data, and applies a normalization process to the extracted character waveform data.

The magnetic recognition process described from step SA2 below has five recognition phases from a first recognition phase in step SA2 to a fifth recognition phase in step SA10. These five recognition phases apply magnetic recognition to the character waveform data of the target character using different methods.

These five recognition phases are sequentially applied to the character waveform data of the target character extracted in step SA1. If the target character is successfully recognized in any of the first to fourth of the five recognition phases, the next magnetic ink character 101 is made the target character and magnetic recognition is applied to the character waveform data for the new target character without proceeding to the next phase.

In step SA15, the character recognition unit 80 determines if the magnetic recognition process was completed, that is, if all magnetic ink characters 101 in the MICR line 100 were processed as the target character. If the magnetic recognition process was completed (step SA15 returns YES), the character recognition unit 80 goes to step SA16 in FIG. 10. If the magnetic recognition process is not completed (step SA15 returns NO), the character recognition unit 80 returns to step SA1 and applies the magnetic recognition process to the next target character.

The process starting from step SA16 in FIG. 10 executes whether or not the target character was successfully recognized in the magnetic recognition process completed in step SA15. Final evaluation of the recognition result in step SA25 considers whether or not the character was recognized in the magnetic recognition process.

In step SA16, the character recognition unit 80 determines if the character used as the first candidate for the target character in the magnetic recognition process through the fifth recognition phase is a target character (a) as shown in FIG. 8A. If the first candidate is target character (a) (step SA16 returns YES), the character recognition unit 80 goes to step SA17. If the first candidate is not the target character (a) (step SA16 returns NO), the character recognition unit 80 goes to step SA21.

In step SA17 the character recognition unit 80 determines if the character selected as the second candidate is the first similar character of the target character (a) (see FIG. 8A). If the second candidate is also the first similar character (step SA17 returns YES), the character recognition unit 80 goes to step SA18 and sets a selection flag. Control then goes to the optical recognition process in step SA24.

As described above, because the risk of magnetic recognition mistakenly recognizing the first similar character (or second similar character) as the target character (a) is high, setting the selection flag signals that the recognized character must be confirmed by comparison with the result of optical recognition (must be selected from among the characters used as candidates in the magnetic recognition process). As further described below, the method of making the final decision in step SA25 changes, and the reliability of the optical recognition result used in the final decision varies, according to whether or not the selection flag is set.

If the second candidate is not the first similar character (step SA17 returns NO), the character recognition unit 80 goes to step SA19. In step SA19, the character recognition unit 80 determines if the character selected as the second candidate is also defined as the second similar character of the target character (a) (see FIG. 8A). If the second candidate is the second similar character (step SA19 returns YES), the character recognition unit 80 goes to the optical recognition process in step SA24.

If the second candidate is not the second similar character (step SA19 returns NO), the character recognition unit 80 goes to step SA20. In step SA20, the character recognition unit 80 additionally defines the second similar character of the target character (a) as a third candidate, and then goes to the optical recognition process in step SA24.

As described above, when the first candidate character is a target character (a) as shown in FIG. 8A, the correct character may also be the second similar character. If the second similar character is the correct character, the correct character cannot be identified even after comparison with the optical recognition result in the final decision made in step SA25 if the second similar character is not included in the candidate characters for magnetic recognition.

If the character selected as the second candidate for the target character (a) of the first candidate is not the second similar character, the character recognition unit 80 adds the second similar character as a third candidate. This enables the character recognition unit 80 to select from among the first candidate, second candidate, and the added third candidate of the magnetic recognition process when determining the recognized character in the final decision step SA25.

In step SA21, the character recognition unit 80 then determines if the character used as the first candidate of the target character through the fifth recognition phase of the magnetic recognition process is a target character (b) as shown in FIG. 8B. If the first candidate is a target character (b) (step SA21 returns YES), the character recognition unit 80 goes to step SA22. If the first candidate is not the target character (b) (step SA21 returns NO), that is, the first candidate is a character other than target character (a) and target character (b), and the character recognition unit 80 goes to the optical recognition process in step SA24.

In step SA22, the character recognition unit 80 determines if the character selected as the second candidate is a similar character to the target character (b) (see FIG. 8B). If the second candidate is a similar character (step SA22 returns YES) the character recognition unit 80 goes to the optical recognition process in step SA24.

If the second candidate is not a similar character (step SA22 returns NO) the character recognition unit 80 goes to step SA23. In step SA23, the character recognition unit 80 adds the character similar to the target character (b) as a third candidate, and then goes to the optical recognition process in step SA24.

As described above, the similar character may also be the correct character when the character selected as the first candidate is a target character (b) as shown in FIG. 8B. As in step SA20, when the character selected as the second candidate is not a character similar to the target character (b) of the first candidate, the similar character is added as a third candidate. This enables the character recognition unit 80 to select from among the first candidate, second candidate, and the added third candidate of the magnetic recognition process when determining the recognized character in the final decision step SA25.

In the optical recognition process in step SA24, the character recognition unit 80 compares the image data extracted from the image captured by the front contact image sensor 52 with the reference image data for all characters, determines the reliability expressing the degree of resemblance therebetween, and recognizes the character. As a result of optical recognition, the character selected as a candidate for the target character is stored together with information indicating the reliability relative to two thresholds (such as 90% and 80%).

Step SA25 then compares the result of magnetic recognition and the result of optical recognition, and makes a final character recognition decision. The method of making this final decision in step SA25 is described next with reference to FIG. 11. FIG. 11 describes the method of making the final decision. More specifically, FIG. 11A shows the method used when the selection flag is set, and FIG. 11B shows the method used when the selection flag is not set.

The decision method used when the selection flag is set in step SA18 is described first with reference to FIG. 11A.

As described above, the selection flag is set when the first candidate equals the target character (a) and the second candidate equals the first similar character, regardless of whether or not the target character was recognized in the magnetic recognition process. More specifically, this means that there is a strong possibility that the candidates were correctly selected from among the 14 characters in the character set during magnetic recognition, but two characters with similar waveforms were selected as candidates, and a recognition error could result from recognizing one of the two candidates based on magnetic recognition alone. The target character is therefore recognized by comparing the two characters used as candidates in magnetic recognition with the result of optical recognition.

FIG. 11A shows the results obtained when A is the first candidate character and B is the second candidate character for magnetic recognition, and the first and second candidate characters for optical recognition are A, B, C, and D. Note that ">=80" in the result column means that the reliability of the first candidate and second candidate in optical recognition is 80% or more, and "80>" in the result column means that the reliability of the first candidate and second candidate in optical recognition is less than 80%.

Using the first candidate and second candidate as the optical recognition result used to make the final decision is predicated on their reliability being at least 80%. However, the second optical recognition candidate is used only if the selection flag is set in step SA18 and the first optical recognition candidate does not match either the first or the second magnetic recognition candidate. In addition, when the recognition reliability is less than 80%, the result of optical recognition (first candidate and second candidate) is not referenced for the final decision.

Furthermore, unlike when the selection flag is not set as shown in FIG. 11B, the reliability of the optical recognition result does not need to be 90% or more when the selection flag is set, and a lower reliability threshold of 80% or more is used. This is because the reliability of the selection of the first candidate and second candidate in the magnetic recognition process is not checked in the final decision when the selection flag is set, and emphasis is placed on making a decision from among the two selected candidates. Because the possibility of being able to select a candidate by optical recognition can be increased by using the lower reliability threshold, the possibility of selecting the correct character can be increased.

As shown in FIG. 11A, when either the first candidate A or the second candidate B for magnetic recognition matches the first candidate for optical recognition, the final decision recognizes the matching character as the magnetic ink character 101. If the first candidate in both magnetic recognition and optical recognition is A, the possibility that the result of magnetic recognition is correct is extremely high. Furthermore, by using whichever of the first and second candidates for magnetic recognition that matches the first candidate for optical recognition, the recognition result can be corrected when a similar character is mistakenly recognized by the magnetic recognition process.

When neither the first candidate A or second candidate B for magnetic recognition matches the first candidate C for optical recognition, such as when the first candidate for optical recognition is C, the magnetic recognition candidates are compared with the second candidate for optical recognition. If either the first candidate or second candidate for magnetic recognition matches the second candidate for optical recognition, the matching character is recognized as the magnetic ink character 101.

However, if the first candidate for optical recognition is C and the second candidate is D, for example, and neither the first candidate A or second candidate B for magnetic recognition matches the first candidate C or second candidate D for optical recognition, the character recognition unit 80 determines that the magnetic ink character 101 could not be recognized.

If the reliability of the optical recognition result is less than 80%, recognition is based on the result of magnetic recognition. If the target character is recognized by magnetic recognition, the character identified by magnetic recognition is recognized as the magnetic ink character 101. If the target character is not recognized by magnetic recognition, the character recognition unit 80 determines the magnetic ink character 101 could not be recognized.

The decision method used in the normal situation when the selection flag is not set in step SA18 is described first with reference to FIG. 11B.

When the selection flag is not set, the first candidate equals the target character (a) but the second candidate does not equal the first similar character; the first candidate equals target character (b); or the first candidate does not equal target character (a) or target character (b). In this event only the first candidate is used as the optical recognition result in the final decision, and is compared with first candidate, second candidate, or the third candidate for magnetic recognition. However, the third candidate for magnetic recognition is only used if the third candidate is set in step SA20 or step SA23.

FIG. 11B shows an example in which A is recognized as the result of magnetic recognition, and an example in which recognition is not possible, when the characters selected as the first, second, and third candidates for magnetic recognition are A, B, and C, respectively. The results in each of these examples when the first candidate for optical recognition is A, B, C, and D are also shown. In the result columns, ">=90" means that the reliability of the first candidate for optical recognition is 90% or more, ">=80" means that reliability is less than 90% and greater than or equal to 80%, and "80>" means that reliability is less than 80%.

When the selection flag is not set, the possibility of a recognition error by magnetic recognition is checked by comparing the result of magnetic recognition with the result of optical recognition. If the magnetic recognition result and the optical recognition result match, the result of magnetic recognition is determined to be correct. However, if the character is recognized by magnetic recognition but the reliability of that recognition is not 90% or more by optical recognition, the magnetic recognition result is rejected and the final result is the character selected as a candidate for magnetic recognition that also matches a character selected as a candidate for optical recognition.

The final decision method used when magnetic recognition determines the target character is A is described first. As shown in FIG. 11B, if the first candidate of both magnetic recognition and optical recognition is A, the result of magnetic recognition is confirmed with a high degree of reliability.

If magnetic recognition determines the target character is A, but the reliability of optical recognition is 90% or more and the first candidate of optical recognition is B or C, the magnetic recognition result is rejected. If in this event the second candidate or third candidate for magnetic recognition matches the first candidate in optical recognition, the magnetic ink character 101 is determined to be the matching character. This enables correcting a recognition error when a similar character is mistakenly recognized by magnetic recognition.

When the reliability of optical recognition is 90% or more but the result of magnetic recognition does not match the first candidate (A), second candidate (B), or third candidate (C), such as when the first candidate of optical recognition is D, the character recognition unit 80 determines that the magnetic ink character 101 cannot be recognized. This avoids confirming a recognition error as the final decision when magnetic recognition produces a recognition error.

If the reliability of optical recognition is less than 90%, the reliability of optical recognition is not sufficient to reject the result of magnetic recognition, and the magnetic ink character 101 is determined to be the character A recognized by magnetic recognition.

The final decision method when the target character cannot be recognized by magnetic recognition (the character is unrecognizable) is described next.

As shown in FIG. 11B, when the reliability of optical recognition is 80% or more, and the first, second, or third candidate of magnetic recognition matches the first candidate of optical recognition, the magnetic ink character 101 is recognized as the character that matches. As a result, the recognition rate can be improved even when magnetic recognition is not possible because the character can be recognized in the final decision.

However, if none of the first, second, and third candidates of magnetic recognition matches the first optical recognition candidate, the magnetic ink character 101 is determined to be unrecognizable. The magnetic ink character 101 is also determined to be unrecognizable if the reliability of optical recognition is less than 80%.

Referring again to FIG. 10, the character recognition unit 80 determines in step SA26 if all magnetic ink characters 101 have been confirmed by the final decision step SA25. If all magnetic ink characters 101 have been confirmed (recognized) (step SA26 returns YES), the process to be performed when reading the MICR line 100 is successful is performed in step SA27. The process performed when the MICR line 100 is successfully read includes, for example, storing the information indicated by the MICR line 100 in a storage unit, recording a specific endorsement image on the back of the check 4 with a printer or other recording device, and discharging the check 4 from the check reader 1.

However, if there is even only one magnetic ink character that could not be recognized (step SA26 returns NO), the host-side control unit 73 executes the operation performed in step SA22 when reading the MICR line 100 fails. The operation performed when reading the MICR line 100 fails discharges the check 4 without printing an endorsement image, for example. The discharged check 4 is then examined to determine why reading failed, or is read again, for example.

The character recognition process of the check reader 1 according to this embodiment of the disclosure ends as described above.

The effect of a recording media processing device, method of controlling a recording media processing device, and a computer-readable recording medium storing a program according to the disclosure as described above is described below.

(1) There are characters whose waveforms can easily resemble each others due to waveform distortion, for example, in magnetic recognition based on comparing character waveform data with reference waveform data. When plural characters selected by magnetic recognition as candidates for recognition are characters for which the waveforms can easily resemble each other, this embodiment of the disclosure recognizes the magnetic ink character 101 by preferentially selecting the character (magnetic recognition candidate) that matches a character recognized by optical recognition with reliability exceeding a specific threshold. As a result, when the magnetic ink character 101 is mistakenly recognized by magnetic recognition, or determining the correct magnetic ink character 101 is difficult, due to the waveforms of the selected plural candidate characters being similar to each other, the correct character can be selected and recognized by comparison with the result of optical recognition. Recognition errors can therefore be reduced and the recognition rate improved in magnetic ink character 101 recognition.

(2) When plural characters selected by magnetic recognition as candidates for the magnetic ink character 101 are characters with mutually similar character waveform data, being able to select any one of the characters identified as a candidate as the correct character is sufficient. By using the lower threshold as the reliability threshold for selecting a candidate by optical recognition, the disclosure increases the possibility of being able to select a candidate by optical recognition, and can thereby increase the possibility of being able to select the correct character by comparison with the result of optical recognition.

(3) When a character with character waveform data similar to the correct character is selected as a candidate and the correct character is not selected as a candidate for magnetic recognition, the correct character cannot be selected (recognized) by comparison with the result of optical recognition. When a character with character waveform data similar to the character waveform data of the character selected as the first candidate is not included in the characters selected by magnetic recognition, the disclosure adds a character with character waveform data similar to the character waveform data of the first candidate character to the plural candidates and can thereby increase the possibility of selecting (recognizing) the correct character.

A preferred embodiment of the disclosure is described above, but the disclosure is not limited thereto and can obviously be modified and adapted as desired within the scope of the disclosure.

For example, target character (a), target character (b), and the similar characters therefor referenced in the foregoing embodiment are not limited to the characters shown in FIG. 8A and FIG. 8B. Target character (a), target character (b), and the similar characters therefor may differ from those shown in FIG. 8A and FIG. 8B due to the printing condition of the magnetic ink characters 101 and the characteristics of the check reader 1, for example.

In addition, the magnetic recognition process has five magnetic recognition phases in the embodiment described above, but the disclosure is not so limited. The magnetic recognition process does not need to include all magnetic recognition phases, and embodiments having only the first recognition phase and second recognition phase, or only the third recognition phase and fourth recognition phase, are conceivable. The recognition phases can be selectively applied based on the type of magnetic ink or the recognition rate of the magnetic recognition process, for example.

The functions of parts of the check reader 1 and the control method of the check reader 1 described in the foregoing embodiment can also be achieved by storing all or part of the foregoing program on a floppy disk, hard disk, optical disc, magneto-optical disc, Compact Disc, flash ROM, or other storage medium, and installing the program on a personal computer, for example.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A recording media processing device comprising:
a magnetic reading unit that magnetically reads a magnetic ink character recorded on a recording medium;
an optical reading unit that optically reads the magnetic ink character; and
a character recognition unit that performs magnetic recognition based on comparing reference waveform data with character waveform data obtained by reading the magnetic ink character with the magnetic reading unit, and optical recognition based on comparing reference image data with image data obtained by scanning the magnetic ink character with the optical reading unit, and recognizes the magnetic ink character;
wherein the character recognition unit selects plural candidate characters for the magnetic ink character by magnetic recognition, and
when the plural candidates are characters having similar character waveform data, recognizes the one candidate character that matches the character recognized by optical recognition with reliability exceeding a specific threshold as the magnetic ink character.

2. The recording media processing device described in claim 1, wherein:
the specific reliability has at least two threshold levels; and
when the plural candidates are characters with similar character waveform data, the character recognition unit uses the lower threshold level when recognizing the magnetic ink character by optical recognition.

3. The recording media processing device described in claim 2, wherein:
the character recognition unit includes the character for which the difference between the character waveform data and the reference waveform data is smallest as a first candidate when selecting the plural candidates, and
when a character with character waveform data similar to the character waveform data of the first candidate is not included in the plural candidates, adds a character with character waveform data similar to the character waveform data of the first candidate character to the plural candidates.

4. A method of controlling a recording media processing device that has a magnetic reading unit that magnetically reads a magnetic ink character recorded on a recording medium, an optical reading unit that optically reads the magnetic ink character, and a character recognition unit that performs magnetic recognition based on comparing reference waveform data with character waveform data obtained by reading the magnetic ink character with the magnetic reading unit, and optical recognition based on comparing reference image data with image data obtained by scanning the magnetic ink character with the optical reading unit, and recognizes the magnetic ink character, the control method comprising steps of:
selecting plural candidate characters for the magnetic ink character by magnetic recognition; and
when the plural candidates are characters having similar character waveform data, recognizing the one candidate character that matches the character recognized by optical recognition with reliability exceeding a specific threshold as the magnetic ink character.

5. The method of controlling a recording media processing device described in claim 4, wherein:
the specific reliability has at least two threshold levels; and
when the plural candidates selected by magnetic recognition are characters with similar character waveform data, the lower threshold level is used for recognition when recognizing the magnetic ink character by optical recognition.

6. The method of controlling a recording media processing device described in claim 5, further comprising steps of:
including the character for which the difference between the character waveform data and the reference waveform data is smallest as a first candidate when selecting the plural candidates; and
adding a character with character waveform data similar to the character waveform data of the first candidate character to the plural candidates when a character with character waveform data similar to the character waveform data of the first candidate is not included in the plural candidates.

7. A non-transitory computer-readable recording medium storing a program executed by a control unit that controls parts of a recording media processing device that has a magnetic reading unit that magnetically reads a magnetic ink character recorded on a recording medium, an optical reading unit that optically reads the magnetic ink character, and a character recognition unit that performs magnetic recognition based on comparing reference waveform data with character waveform data obtained by reading the magnetic ink character with the magnetic reading unit, and optical recognition based on comparing reference image data with image data obtained by scanning the magnetic ink character with the optical reading unit, and recognizes the magnetic ink character, the program comprising steps of:
selecting plural candidate characters for the magnetic ink character by magnetic recognition; and
when the plural candidates are characters having similar character waveform data, recognizing the one candidate character that matches the character recognized by optical recognition with reliability exceeding a specific threshold as the magnetic ink character.

\* \* \* \* \*